(12) United States Patent
Matsunaga et al.

(10) Patent No.: US 10,634,186 B2
(45) Date of Patent: Apr. 28, 2020

(54) BALL BEARING, SPINDLE DEVICE, AND MACHINE TOOL

(71) Applicant: NSK LTD., Tokyo (JP)

(72) Inventors: Kyohei Matsunaga, Fujisawa (JP); Yoshiaki Katsuno, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/325,451

(22) PCT Filed: Aug. 10, 2017

(86) PCT No.: PCT/JP2017/029153
§ 371 (c)(1),
(2) Date: Feb. 14, 2019

(87) PCT Pub. No.: WO2018/034240
PCT Pub. Date: Feb. 22, 2018

(65) Prior Publication Data
US 2019/0170187 A1    Jun. 6, 2019

(30) Foreign Application Priority Data

Aug. 15, 2016   (JP) .................................. 2016-159260

(51) Int. Cl.
*F16C 33/66* (2006.01)
*F16C 19/18* (2006.01)
(Continued)

(52) U.S. Cl.
CPC ............ *F16C 19/181* (2013.01); *F16C 19/28* (2013.01); *F16C 33/6637* (2013.01);
(Continued)

(58) Field of Classification Search
CPC .... F16C 19/163; F16C 19/181; F16C 19/182; F16C 19/183; F16C 19/184; F16C 19/49;
(Continued)

(56) References Cited

U.S. PATENT DOCUMENTS

| 4,606,656 A | * | 8/1986 | LaRou | .................. F16C 23/084 |
| | | | | 384/475 |
| 6,176,349 B1 | * | 1/2001 | Kishi | .................... F16C 19/163 |
| | | | | 184/55.1 |

(Continued)

FOREIGN PATENT DOCUMENTS

| CN | 101595319 A | 12/2009 |
| CN | 103180627 A | 6/2013 |

(Continued)

OTHER PUBLICATIONS

Communication dated Nov. 4, 2019, issued by the State Intellectual Property Office of P.R. China in counterpart Chinese Application No. 201780050040.9.

(Continued)

*Primary Examiner* — Phillip A Johnson
(74) *Attorney, Agent, or Firm* — Sughrue Mion, PLLC

(57) ABSTRACT

In an angular contact ball bearing (10), an outer ring (12) has at least one radial hole (15) passing through in the radial direction from the outer peripheral surface to the inner peripheral surface of the outer ring (12), and the axial-direction position of an inner-diameter-side opening part of the radial hole (15) is located between the groove bottom of the outer ring (12) and the point of contact between a ball (13) and the outer ring (12), as well as being separated from a contact ellipse between the ball (13) and an outer ring track groove (12a).

13 Claims, 9 Drawing Sheets

(51) Int. Cl.
*F16C 33/78* (2006.01)
*F16C 19/28* (2006.01)
*F16C 19/16* (2006.01)
*F16C 33/58* (2006.01)

(52) U.S. Cl.
CPC .......... *F16C 33/6662* (2013.01); *F16C 33/78* (2013.01); *F16C 19/163* (2013.01); *F16C 33/586* (2013.01); *F16C 2322/39* (2013.01)

(58) Field of Classification Search
CPC .... F16C 19/541; F16C 19/542; F16C 19/543; F16C 33/6659; F16C 33/6662; F16C 33/7886
USPC ......................................................... 384/475
See application file for complete search history.

(56) References Cited

U.S. PATENT DOCUMENTS

| | | | | |
|---|---|---|---|---|
| 8,403,110 | B2* | 3/2013 | Suzuki | B23Q 11/123 184/6.26 |
| 2003/0113048 | A1* | 6/2003 | Azumi | B23Q 11/123 384/475 |
| 2006/0239598 | A1 | 10/2006 | Matsuyama et al. | |
| 2010/0046872 | A1 | 2/2010 | Takiuchi et al. | |
| 2013/0202237 | A1 | 8/2013 | Kosugi | |
| 2018/0023621 | A1 | 1/2018 | Matsunaga et al. | |

FOREIGN PATENT DOCUMENTS

| | | | | |
|---|---|---|---|---|
| DE | 195 30 903 | A1 | 3/1996 | |
| DE | 10 2007 034023 | A1 | 1/2009 | |
| JP | 60-103725 | U | 7/1985 | |
| JP | 61109914 | A * | 5/1986 | ............. F16C 33/62 |
| JP | 01-149020 | U | 10/1989 | |
| JP | 2003-049851 | A | 2/2003 | |
| JP | 2013-079711 | A | 5/2013 | |
| JP | 2016-142393 | A | 8/2016 | |
| WO | 2004011817 | A1 | 2/2004 | |
| WO | 2008/065942 | A1 | 6/2008 | |

OTHER PUBLICATIONS

Communication dated Dec. 3, 2019 issued by the Japanese Patent Office in counterpart Japanese Application No. 2016-159260.
Communication dated Jul. 2, 2019, issued by the European Patent Office in counterpart European Application No. 17841463.7.
International Search Report (PCT/ISA/210) dated Oct. 24, 2017 issued by the International Searching Authority in International Application No. PCT/KR2017/029153.
Written Opinion (PCT/ISA/237) dated Oct. 24, 2017 issued by the International Searching Authority in International Application No. PCT/KR2017/029153.

* cited by examiner

BALL BEARING, SPINDLE DEVICE, AND MACHINE TOOL

TECHNICAL FIELD

The present invention relates to a ball bearing, a spindle device and a machine tool, and more specifically, to an outer ring oil supply-type ball bearing.

RELATED ART

In recent years, requests for a high speed spindle for machine tool increase so as to improve cutting efficiency. Also, recently, needs to apply the spindle to a five-axis processing machine capable of processing a member to be processed having a complex shape without using a plurality of machine tools and without set-up change increase so as to increase production efficiency. In the five-axis processing machine, since a spindle or a table rotates, it is required to shorten an axial length of the spindle because of needs such as space saving by shortening of a radius of rotation or power saving by reduction in inertia upon rotation or weight saving.

As a lubrication method of a rolling bearing that is adopted for a machine tool spindle, grease lubrication, oil/air lubrication, oil/mist lubrication and the like may be exemplified. In general, the oil/air lubrication is adopted in a region of high-speed rotation (dmn value: 800,000 or higher). As the oil/air lubrication of the related art, a type where high-pressure air and fine oil particles are supplied from a bearing side surface into a bearing by using a nozzle piece for oil supply 101 arranged at a side of a bearing 100 shown in FIG. 10A or a nozzle piece for oil supply 101 inserted in a radial through-hole 102a of an outer ring spacer 102 arranged at a side of a bearing 100 shown in FIG. 10B has been known.

In the above type, it is necessary to separately provide the component for oil supply such as the nozzle piece 101, so that the number of components of the spindle increases. Accordingly, the cost of the spindle increases as a whole and labor for management also increases. Also, since the nozzle piece 101 is used, a shape of an outer ring spacer and a structure of a housing are complicated, so that labor for design/processing of the spindle increases. Also, since the nozzle piece 101 is provided to an axial side surface of the bearing, a spacer length is required to some extent, so that an axial length of the spindle increases. Thereby, a size of the machine tool increases, a weight of the spindle increases by the increased axial length, and a critical speed (The critical speed means a rotating speed calculated from an eigen frequency of the spindle. When the spindle is rotated in a region of the critical speed, the vibration largely increases) of the spindle is lowered. Also, by an air curtain generated in association with the high-speed rotation (the air curtain means a wall of a circumferential high-speed air stream generated due to friction between the air and an outer-diameter surface of an inner ring being rotating at high speed), the supply of oil particles from the nozzle for oil supply is disturbed, so that the lubricating oil is difficult to be securely supplied into the bearing. Like this, the oil/air lubrication of the related art has higher lubricity under high-speed rotation than the grease lubrication. However, as the speed increases, it is important to cope with the speed-up.

Also, as the other oil/air lubrication type, as shown in FIG. 11, an outer ring oil supply-type bearing 110 where a circumferential oil groove 112 is formed in an outer peripheral surface of an outer ring 111 and a radial oil hole 113 is formed at the same axial position as the oil groove 112 is used (for example, refer to Patent Document 1). In the outer ring oil supply-type bearing, even when the bearing is used for high-speed rotation, the supply of oil particles is not disturbed by the air curtain. For this reason, it is possible to stably use the spindle even at the high-speed rotation.

FIG. 12 is a schematic view of spindles in each of cases where the oil/air lubrication using the nozzle piece 101 is performed and the oil/air lubrication of an outer ring oil supply specification is performed. In FIG. 12, the upper half shows a spindle 120 where the oil/air lubrication of the outer ring oil supply specification is performed, and the lower half shows a spindle 120A where the oil/air lubrication using the nozzle piece 101 is performed. Meanwhile, in FIG. 12, a reference numeral 121 indicates a rotary shaft, and a reference numeral 122 indicates a rotor of a motor to be fitted to the rotary shaft 121. Like this, in the case of the oil/air lubrication using the nozzle piece 101, a spacer having a predetermined axial length or longer is required so as to supply the lubricating oil from a side surface of the bearing 100. In contrast, in the case of the outer ring oil supply specification, it is not necessary to provide a spacer for oil supply, so that it is possible to omit the nozzle piece, to simplify the structure of the spacer, and to shorten the axial length of the spacer 123, as compared to the case where the nozzle piece is used. Thereby, in the case of the outer ring oil supply specification, it is possible to simply design and process the spindle and the component for oil supply, to easily manage the components, and to reduce the entire cost relating to the design/manufacturing/management of the machine tool. In addition, it is possible to shorten the axial length, so that it is possible to reduce the size of the machine tool and to improve the critical speed of the spindle. Like this, the outer ring oil supply-type bearing has many merits, as compared to the side surface oil supply-type bearing of the related art.

CITATION LIST

Patent Documents

Patent Document 1: JP-A-2013-79711

SUMMARY OF INVENTION

Problems to be Solved by Invention

In the meantime, the ball bearing for the machine tool spindle is used with diverse conditions, in conformity to the specification of the spindle. When the number of rotations of the bearing, an initial preload, a magnitude of an external load during processing, and the like are different, internal states (a contact angle, a size of a contact ellipse of a contact part between an inner ring groove and a ball or between an outer ring groove and the ball, a contact surface pressure and the like) of the bearing being used are different. For this reason, for the ball bearing that is used with diverse conditions, it is required to improve the lubricity of the bearing.

The present invention has been made in view of the above situations, and an object thereof is to provide a ball bearing, a spindle device and a machine tool capable of accomplishing better lubrication performance by setting appropriately an axial position of a radial hole provided in an outer ring of an outer ring oil supply-type bearing, depending on use applications of the bearing.

Means for Solving Problems

The object of the present invention is accomplished by following configurations.

(1) A ball bearing comprising:

an inner ring having an inner ring raceway groove formed in an outer peripheral surface:

an outer ring having an outer ring raceway groove formed in an inner peripheral surface, a counterbore formed at one axial side of the outer ring raceway groove, and a groove shoulder formed at the other axial side of the outer ring raceway groove; and a plurality of balls arranged rollably between the inner ring raceway groove and the outer ring raceway groove, wherein the ball bearing is lubricated by lubricating oil, wherein the outer ring has at least one radial hole penetrating from an outer peripheral surface thereof to the inner peripheral surface thereof in a radial direction, and wherein an axial position of an inner diameter-side opening of the radial hole is located between a groove bottom of the outer ring and a contact point of the ball and the outer ring and is spaced from a contact ellipse between the ball and the outer ring raceway groove.

(2) A ball bearing comprising:

an inner ring having an inner ring raceway groove formed in an outer peripheral surface;

an outer ring having an outer ring raceway groove formed in an inner peripheral surface, a counterbore formed at one axial side of the outer ring raceway groove, and a groove shoulder formed at the other axial side of the outer ring raceway groove; and a plurality of balls arranged rollably between the inner ring raceway groove and the outer ring raceway groove, wherein the ball bearing is lubricated by lubricating oil, wherein the outer ring has at least one radial hole penetrating from an outer peripheral surface thereof to the inner peripheral surface thereof in a radial direction, and wherein an axial position of an inner diameter-side opening of the radial hole is located in the outer ring raceway groove at an opposite side to a groove bottom of the outer ring with respect to a contact point of the ball and the outer ring and is spaced from a contact ellipse between the ball and the outer ring raceway groove.

(3) A ball bearing comprising:

an inner ring having an inner ring raceway groove formed in an outer peripheral surface;

an outer ring having an outer ring raceway groove formed in an inner peripheral surface, a counterbore formed at one axial side of the outer ring raceway groove, and a groove shoulder formed at the other axial side of the outer ring raceway groove; and a plurality of balls arranged rollably between the inner ring raceway groove and the outer ring raceway groove, wherein the ball bearing is lubricated by lubricating oil, wherein the outer ring has at least one radial hole penetrating from an outer peripheral surface thereof to the inner peripheral surface thereof in a radial direction, and wherein an axial position of an inner diameter-side opening of the radial hole is spaced from a contact ellipse between the ball and the outer ring raceway groove and is provided over the outer ring raceway groove and the groove shoulder at an opposite side to a groove bottom of the outer ring with respect to a contact point of the ball and the outer ring.

(4) A ball bearing comprising:

an inner ring having an inner ring raceway groove formed in an outer peripheral surface:

an outer ring having an outer ring raceway groove formed in an inner peripheral surface, a counterbore formed at one axial side of the outer ring raceway groove, and a groove shoulder formed at the other axial side of the outer ring raceway groove; and a plurality of balls arranged rollably between the inner ring raceway groove and the outer ring raceway groove, wherein the ball bearing is lubricated by lubricating oil, wherein the outer ring has at least one radial hole penetrating from an outer peripheral surface thereof to the inner peripheral surface thereof in a radial direction, wherein an axial position of an inner diameter-side opening of the radial hole is provided in the groove shoulder, and wherein at least a part of the inner diameter-side opening of the radial hole axially overlaps the ball.

(5) The ball bearing according to any one of the above (1) to (4), wherein the outer peripheral surface of the outer ring is formed with a concave groove which is formed along a circumferential direction and which is configured to communicate with the radial hole.

(6) The ball bearing according to the above (5), wherein the outer peripheral surface of the outer ring is formed with annular grooves which is formed along the circumferential direction and which is formed at both axial sides with the concave groove being interposed therebetween, and wherein an annular seal member is arranged in each of the annular grooves.

(7) The ball bearing according to any one of the above (1) to (6), wherein a diameter of the radial hole is 0.5 to 1.5 mm.

(8) The ball bearing according to any one of the above (1) to (7), wherein a contact angle of the ball is within a range of 25 to 600.

(9) A spindle device comprising:

the ball bearing according to any one of the above (1) to (8);

a cylindrical roller bearing arranged at a side of the ball bearing; and a housing to which the outer ring of the ball bearing and an outer ring of the cylindrical roller bearing are internally fitted, wherein a radial gap $\Delta$ between the outer peripheral surface of the outer ring of the ball bearing and an inner peripheral surface of the housing to which the outer ring of the ball bearing is internally fitted is 0.01 to 1 mm measured by a radius measuring method.

(10) A machine tool comprising the spindle device according to the above (9).

Effects of Invention

According to the ball bearing of the present invention, the outer ring has at least one radial hole penetrating from the outer peripheral surface to the inner peripheral surface in the radial direction, and the axial position of the inner diameter-side opening of the radial hole is located between the groove bottom of the outer ring and the contact point of the ball and the outer ring and is spaced from the contact ellipse between the ball and the outer ring raceway groove. Accordingly, it is possible to obtain better lubrication performance in the ball bearing that is to be used with conditions of low speed and high initial preload.

Also, according to the ball bearing of the present invention, the outer ring has at least one radial hole penetrating from the outer peripheral surface to the inner peripheral surface in a radial direction, and the axial position of the inner diameter-side opening of the radial hole is located in the outer ring raceway groove at the opposite side to the groove bottom of the outer ring with respect to the contact point of the ball and the outer ring and is spaced from the contact ellipse between the ball and the outer ring raceway groove. Accordingly, it is possible to obtain better lubrication performance in the ball bearing that is to be used in a high-speed region.

Also, according to the ball bearing of the present invention, the outer ring has at least one radial hole penetrating from the outer peripheral surface to the inner peripheral surface in a radial direction, and the axial position of the inner diameter-side opening of the radial hole is spaced from the contact ellipse between the ball and the outer ring raceway groove, and is provided over the outer ring raceway groove and the groove shoulder at the opposite side to the groove bottom of the outer ring with respect to the contact point of the ball and the outer ring. Accordingly, it is possible to obtain better lubrication performance in the ball bearing that is to be used in a high-speed region.

Also, according to the ball bearing of the present invention, the outer ring has at least one radial hole penetrating from an outer peripheral surface to the inner peripheral surface in a radial direction, and the axial position of the inner diameter-side opening of the radial hole is provided in the groove shoulder and at least a part of the inner diameter-side opening of the radial hole axially overlaps the ball. Accordingly, it is possible to obtain better lubrication performance in the ball bearing that is to be used in a high-speed region.

DETAILED DESCRIPTION OF PREFERRED EMBODIMENTS

Hereinafter, a ball bearing, a spindle device and a machine tool in accordance with each embodiment of the present invention will be described in detail with reference to the drawings.

First Embodiment

A thrust angular ball bearing 10 in accordance with a first embodiment is incorporated to a lathe spindle and is generally used in a low-speed (dmn value: 600,000 or lower) region. Also, since a high external axial load generated during processing is applied, the thrust angular ball bearing 10 is used in a state where a high initial preload of about 1000 to 6000N is applied.

Figure 1:
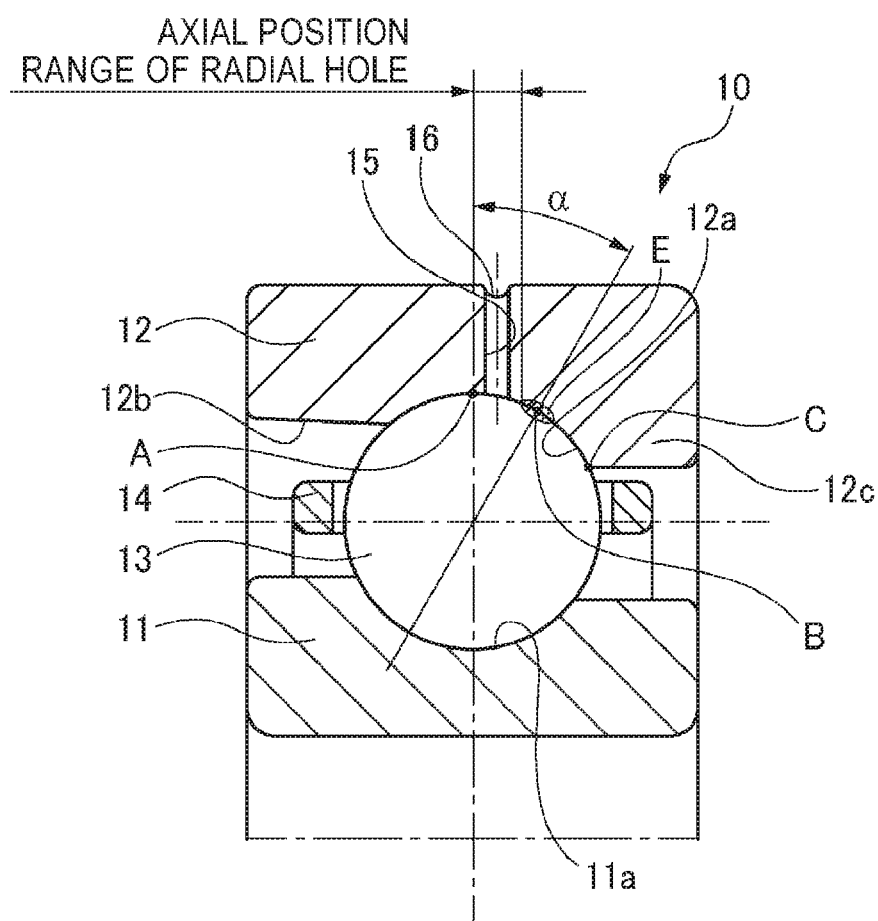
FIG. 1 is a sectional view depicting a ball bearing in accordance with a first embodiment of the present invention.

As shown in FIG. 1, the thrust angular ball bearing 10 includes an inner ring 11 having a circular arc-shaped inner ring raceway groove 11a formed in an outer peripheral surface, an outer ring 12 having a circular arc-shaped outer ring raceway groove 12a formed in an inner peripheral surface, and a plurality of balls 13 each of which is held by a cage 14, has a predetermined contact angle α and is arranged rollably between the inner ring raceway groove 11a and the outer ring raceway groove 12a. One axial inner peripheral surface of the outer ring 12 is formed with a counterbore 12b, and the other axial inner peripheral surface is formed with a groove shoulder 12c.

The contact angle α is set to 25 to 60°, and preferably to 30 to 60° so as to increase axial stiffness.

The thrust angular ball bearing 10 is an outer ring oil supply-type bearing, and the outer ring 12 has a radial hole 15 penetrating from the outer peripheral surface to the inner peripheral surface in a radial direction. Also, the outer peripheral surface of the outer ring 12 is formed with a concave groove 16 configured to communicate with the radial hole 15 along a circumferential direction. Thereby, in the angular ball bearing 10, oil particles and lubricating air supplied from an oil supply passage of a housing (not shown) are directly supplied to the ball 13 through the concave groove 16 and the radial hole 15 of the outer ring 12, so that the oil/air lubrication is performed.

On the other hand, instead of the configuration where the outer ring 12 is formed with the circumferential concave groove, the circumferential concave groove may be formed at a position of an opening of the oil supply passage that is formed in an inner peripheral surface of the housing and is configured to communicate with the radial hole 15.

Also, in the first embodiment, an axial position of an inner diameter-side opening of the radial hole 15 is set so that it is located between a groove bottom (a groove bottom position A) of the outer ring 12 and a contact point (a contact position B) of the ball 13 and the outer ring 12 and is spaced from a contact ellipse E between the ball 13 and the outer ring raceway groove 12a.

Figure 2A:
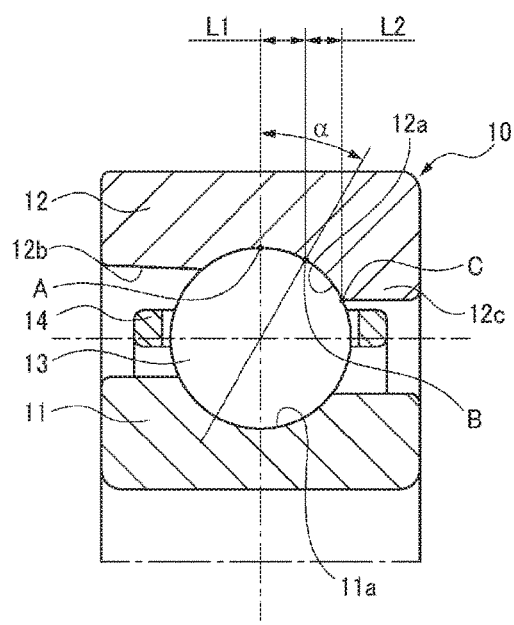
FIG. 2A is a sectional view of the ball bearing depicting a contact angle before a preload is applied to the ball bearing of FIG. 1.

Here, as shown in FIG. 2A, since the contact angle α is large, the thrust angular ball bearing 10 has a long axial distance L1 from the groove bottom position A of the outer ring 12 to the contact position B of the outer ring 12 and the ball 13 and a short axial distance L2 from the contact position B of the outer ring 12 and the ball 13 to a start position C of the groove shoulder.

Figure 2B:
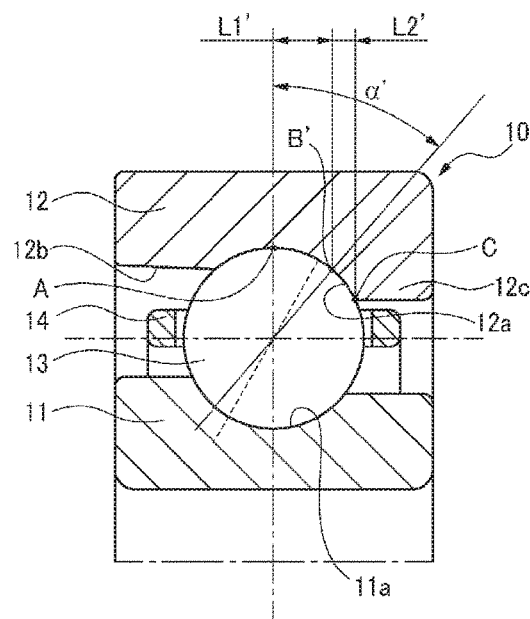
FIG. 2B is a sectional view of the ball bearing depicting the contact angle after an initial preload is applied.

Also, as described above, since the high initial preload is applied to the thrust angular ball bearing 10, the contact angle changes (increases) from the angle α, which is an angle before the initial preload is applied, to an angle α', and the contact position of the outer ring 12 and the ball 13 is also moved to B', as shown in FIG. 2B. Accordingly, in a state where the ball bearing 10 is incorporated in the spindle, an axial distance L1' from the groove bottom position A of the outer ring 12 to the contact position B' of the outer ring 12 and the ball 13 becomes longer than the axial distance L1 of FIG. 2A, and an axial distance L2' from the contact position B' of the outer ring 12 and the ball 13 to the start position C of the groove shoulder of the outer ring becomes shorter than the axial distance L2 of FIG. 2A.

Also, from a standpoint of lubricity during rotation of the bearing, the axial position of the radial hole 15 is preferably provided at a contact angle-side (=an opposite side to the counterbore) from the groove bottom position A of the outer ring 12. This is to supply the lubricating oil more securely to the contact position B of the outer ring 12 and the ball 13 during the rotation of the bearing.

Also, from a standpoint of suppressing an increase in contact surface pressure at the contact positions of the inner and outer rings 11, 12 and the ball 13, the inner diameter-side opening of the radial hole 15 is set so as not to axially overlap the contact ellipse E between the ball 13 and the outer ring raceway groove 12a. The contact ellipse E means a contact ellipse that is to be generated only by the initial preload, more preferably a contact ellipse that is to be generated by a bearing internal load including an external load to be generated when processing a member to be processed.

From the above standpoints, as shown in FIG. 1, for the ball bearing 10 that is to be used with conditions of low speed and high initial preload, the axial position of the inner diameter-side opening of the radial hole 15 provided in the outer ring 12 is preferably set closer to the contact angle-side than the groove bottom position A of the outer ring 12 and closer to the groove bottom-side than the contact position B of the outer ring 12 and the ball 13.

Also, as a spindle device in which the thrust angular ball bearing 10 as described above is used, a spindle device for machine tool, a spindle device for roll rotation of a printing machine, a spindle device for frictional stirrer (FSW) and a spindle device for driving a variety of industrial machines may be exemplified.

Figure 3A:
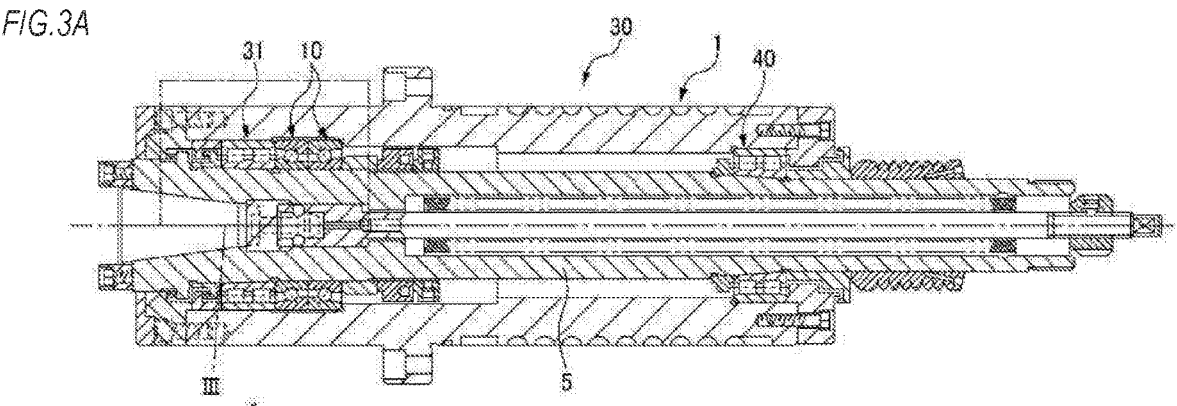
FIG. 3A is a sectional view of a spindle device to which the ball bearing of the first embodiment is applied.

For example, as a spindle device 30 in which the thrust angular ball bearing 10 is used, a configuration where the spindle device is used in combination with a cylindrical roller bearing 31 is adopted, as shown in FIG. 3A. That is, in the spindle device 30, a front bearing is configured by a pair of the thrust angular ball bearings 10 of the first embodiment and the cylindrical roller bearing 31, and a rear bearing is configured by the other cylindrical roller bearing 40. A rotary shaft 5 is rotatably supported to a housing 1 via the bearings 10, 31, 40. The respective outer rings of the pair of thrust angular ball bearings 10, the cylindrical roller bearing 31 and the other cylindrical roller bearing 40 are internally fitted to an inner peripheral surface of the housing 1.

Figure 3B:
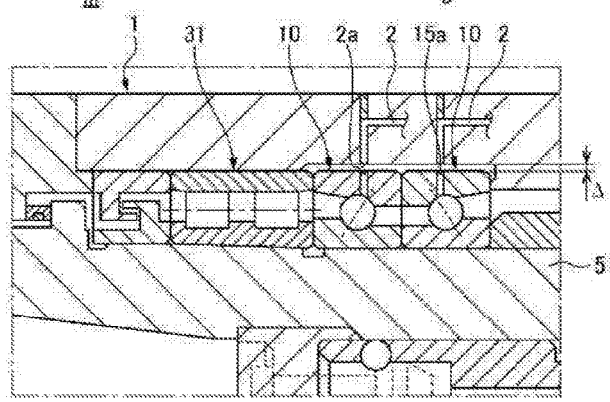
FIG. 3B is an enlarged view of a III part of FIG. 3A.

In the above configuration, as shown in FIG. 3B, a radial gap Δ of 0.01 to 1 mm between the outer peripheral surface of the outer ring 12 of the thrust angular ball bearing 10 and the inner peripheral surface of the housing 1, to which the outer ring 12 of the ball bearing 10 is internally fitted, is secured by a radius measuring method so that a radial load is not to be applied in the thrust angular ball bearing 10, and a design is made so that both the components do not overlap.

In the design, a radial distance between a housing inner diameter-side opening 2a of a lubricating oil introduction hole 2 formed in the housing 1 and an outer ring outer diameter-side opening 15a of the radial hole 15 provided in the outer ring 12 is increased, so that when supplying the lubricating oil, a possibility that the oil will be leaked from a space between the inner peripheral surface of the housing 1 and the outer peripheral surface of the outer ring 12 increases.

Figure 4:
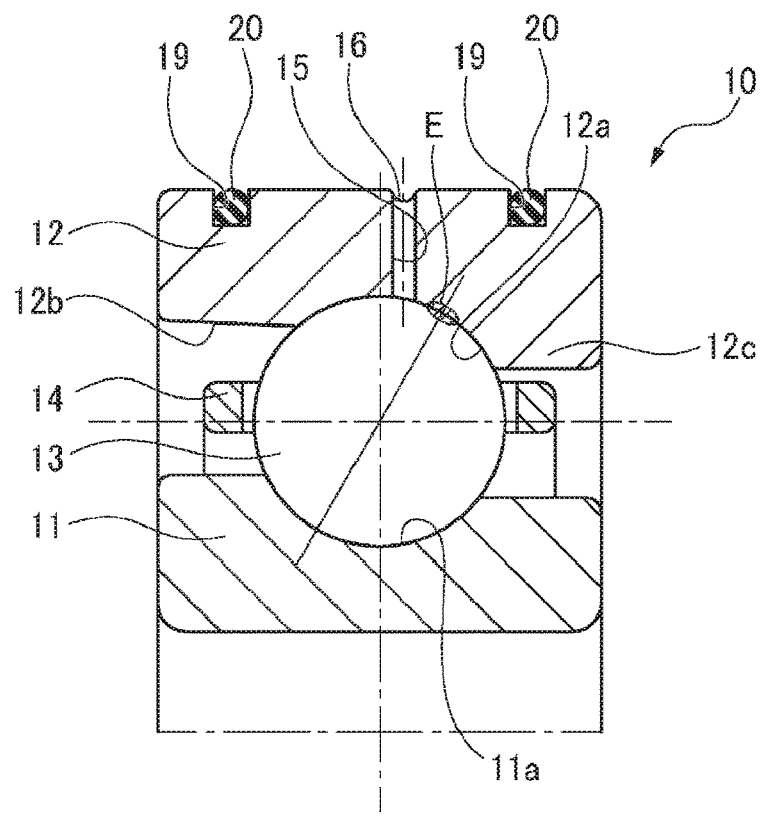
FIG. 4 is a sectional view depicting a ball bearing in accordance with a modified embodiment of the first embodiment.

For this reason, like a modified embodiment shown in FIG. 4, the outer peripheral surface of the outer ring 12 is formed with annular grooves 19 at both axial sides with the concave groove 16 being interposed therebetween along the circumferential direction, and a seal member 20, which is an annular elastic member such as an O-ring, is arranged in each of the annular grooves 19, so that it is possible to prevent the oil leakage.

Also, in the case of the grease lubrication, under conditions of the high initial preload and the high external load, deterioration of the grease such as physical deterioration due to shears at the ball and the inner and outer rings and chemical deterioration due to high heat generation of the bearing is promoted, so that the bearing may be damaged at an early stage due to poor lubrication. As one of countermeasures against the early damage, an initial enclosed amount of grease may be increased. However, when the enclosed amount of grease is increased, the resistance is correspondingly increased during the rotation of the bearing, so that the rotating torque of the spindle increases and the heat generation of the bearing increases. Therefore, from standpoints of improvements on lubricity and reliability during the rotation of the bearing, the oil/air lubrication has merits, as compared to the grease lubrication.

Meanwhile, in the first embodiment, the diameter of the radial hole 15 is set to 0.5 to 1.5 mm, considering the supply ability of the lubricating oil and the interference prevention with the contact ellipse. Also, in the first embodiment, the radial hole 15 has a uniform diameter in the radial direction.

Therefore, according to the thrust angular ball bearing 10 of the first embodiment, since the axial position of the inner diameter-side opening of the radial hole 15 provided in the outer ring 12 is located between the groove bottom of the outer ring 12 and the contact point of the ball 13 and the outer ring 12, when the thrust angular ball bearing is used with conditions of low speed and high initial preload, it is possible to supply the lubricating oil more securely to the contact position B of the outer ring 12 and the ball 13 during the rotation of the bearing, so that it is possible to obtain better lubrication performance.

Also, the axial position of the inner diameter-side opening of the radial hole 15 is located at the position spaced from the contact ellipse E between the ball 13 and the outer ring raceway groove 12a, so that it is possible to suppress an increase in the contact surface pressure at the contact positions of the inner and outer rings 11, 12 and the ball 13.

Second Embodiment

Figure 5:
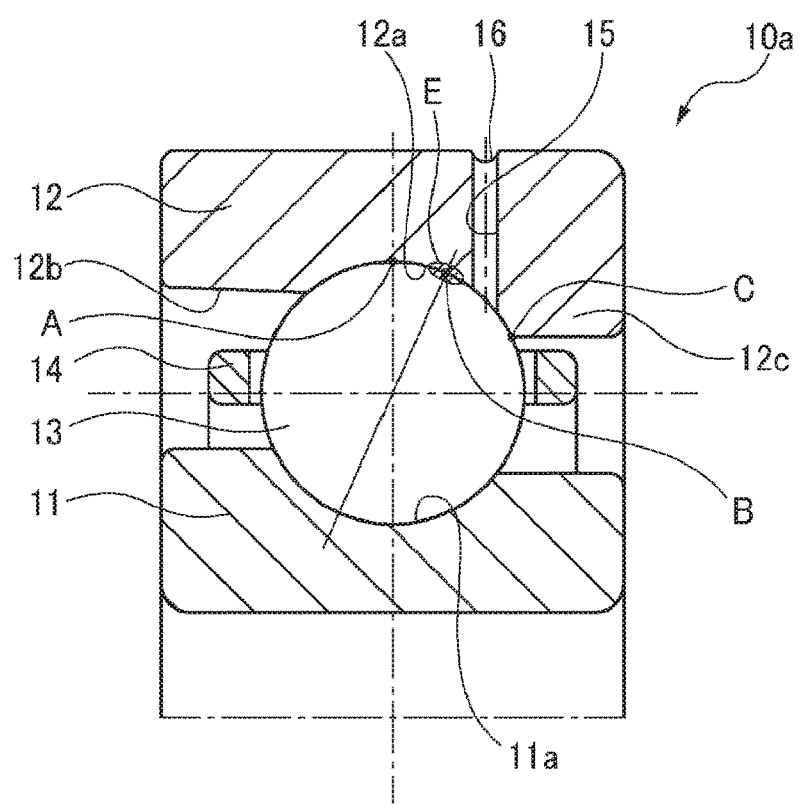
FIG. 5 is a sectional view depicting a ball bearing in accordance with a second embodiment of the present invention.
Figure 6A:
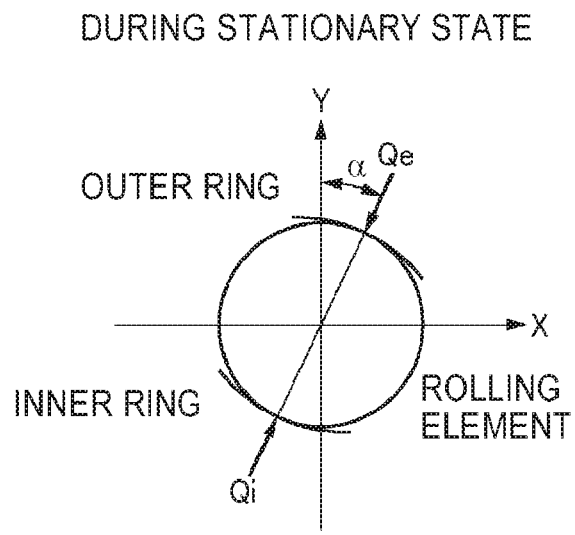
FIG. 6A depicts a loaded state of a rolling element during a stationary state of a bearing.
Figure 6B:
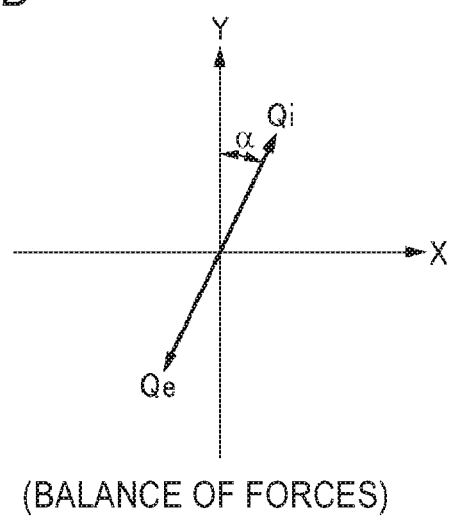
FIG. 6B depicts a balance of forces during the stationary state of the bearing.
Figure 6C:
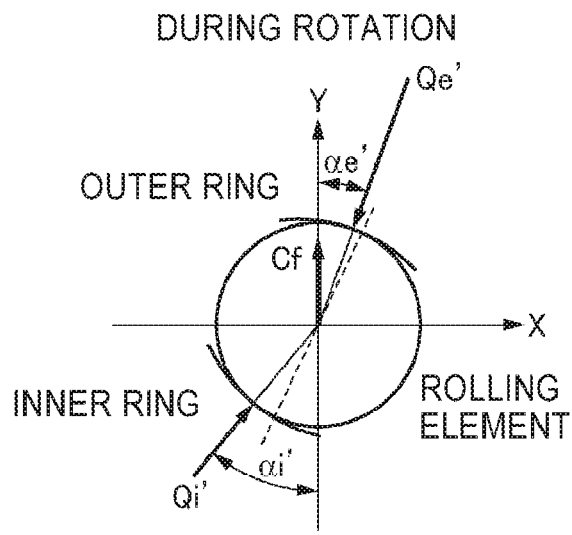
FIG. 6C depicts a loaded state of the rolling element during rotation of the bearing.
Figure 6D:
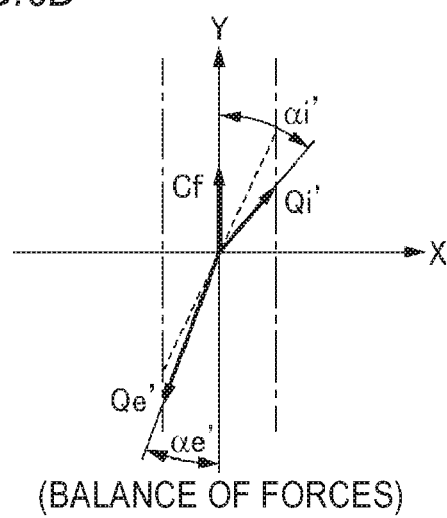
FIG. 6D depicts a balance of forces during the rotation of the bearing.

Subsequently, a ball bearing of a second embodiment is described with reference to FIG. 5.

A ball bearing 10a of the second embodiment is incorporated to a spindle that is to be used in a high-speed region, like a spindle for machining center, the contact angle α is set smaller than the first embodiment, and the axial position of the inner diameter-side opening of the radial hole 15 is also different from the first embodiment. That is, in the second embodiment, as shown in FIG. 5, the axial position of the inner diameter-side opening of the radial hole 15 is located in the outer ring raceway groove 12a at an opposite side to the groove bottom A of the outer ring 12 with respect to the contact point (contact position B) of the ball 13 and the outer ring 12 and is spaced from the contact ellipse E between the ball 13 and the outer ring raceway groove 12a.

For the ball bearing 10a that is to be used at high speed, a constant pressure preload type (a type of applying a preload to the bearing by using a coil spring, a dish spring or the like, and capable of keeping a substantially constant bearing internal load even during the rotation of the bearing) is generally applied so as to suppress an increase in bearing internal load during an operation. The ball bearing 10a that is to be used in the high-speed region has a change in bearing internal state, which is different from the cases where the ball bearing is used during the rotation of the bearing, at the low speed of the first embodiment and at medium load. As one of features of the change in bearing internal state during the high-speed rotation, a decrease in outer ring-side contact angle may be exemplified.

FIG. 6 depicts changes in bearing internal state during the high-speed rotation. In FIG. 6, an X-axis and a Y-axis indicate an axial direction of the bearing and a radial direction of the bearing, respectively. Also, FIG. 6A depicts a loaded state of the ball during a stationary state of the bearing, FIG. 6C depicts a loaded state of the ball during the rotation of the bearing, Qi and Qe indicate a rolling element load applied from the inner ring-side and a rolling element load applied from the outer ring-side, and Cf indicates a centrifugal force that is generated by the rotation of the bearing. When the bearing rotates at high speed, the high centrifugal force is applied to the ball, as shown in FIG. 6C. Accompanied by the applying of the centrifugal force, directions and magnitudes of the rolling element loads applied from the inner and outer rings of the bearing are changed. Focusing on the rolling element load of the outer ring-side, the direction of the rolling element load, i.e., the contact angle of the outer ring-side is decreased by the applied centrifugal force. Particularly, in the case of the constant pressure preload type, the magnitude of the axial load of the bearing is not changed due to characteristics of the preload type, and the direction and magnitude of the rolling element load are more considerably changed.

Figure 7A:
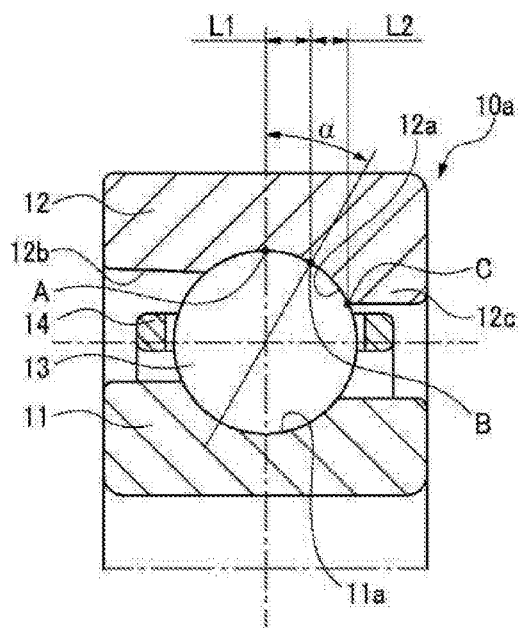
FIG. 7A is a sectional view of the ball bearing depicting a contact angle before an initial preload is applied to the ball bearing of FIG. 5.
Figure 7B:
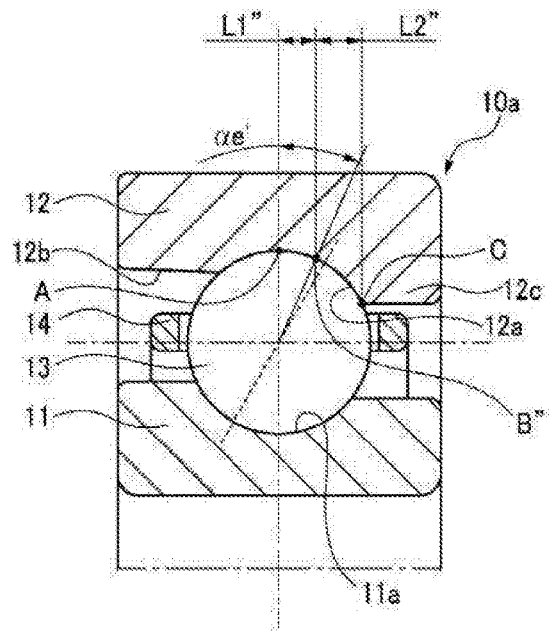
FIG. 7B is a sectional view of the ball bearing depicting the contact angle after the initial preload is applied.

FIG. 7 is a radially sectional view of the angular ball bearing that is used at high speed. As shown in FIG. 7B, during the rotation of the bearing, the contact angle of the outer ring-side is decreased. Accordingly, the axial distance from the groove bottom position A of the outer ring 12 to the contact position B of the outer ring 12 and the ball 13 is shortened from L1 during the stationary state of the bearing to L1". In contrast, the axial distance from the contact position B of the outer ring 12 and the ball 13 to the start position C of the groove shoulder of the outer ring is increased from L2 to L2".

For this reason, from the standpoint of the lubricity during the rotation of the bearing, the axial position of the radial hole 15 of the outer ring 12 is preferably provided in the outer ring raceway groove 12a at an opposite side to the groove bottom position A of the outer ring 12 with respect to the contact point of the ball 13 and the outer ring 12. Also, from the standpoint of suppressing an increase in contact surface pressure at the contact positions B of the inner and outer ring 11, 12 and the ball 13, the inner diameter-side opening of the radial hole 15 provided in the outer ring 12 is set so as not to axially overlap the contact ellipse E between the outer ring 12 and the ball 13.

From the above standpoints, for the ball bearing 10a that is to be used in the high-speed region, the axial position of the inner diameter-side opening of the radial hole 15 provided in the outer ring 12 is located in the outer ring raceway groove 12a at an opposite side to the groove bottom A of the outer ring 12 with respect to the contact point of the ball 13 and the outer ring 12 and is spaced from the contact ellipse between the ball 13 and the outer ring raceway groove 12a.

Figure 8:
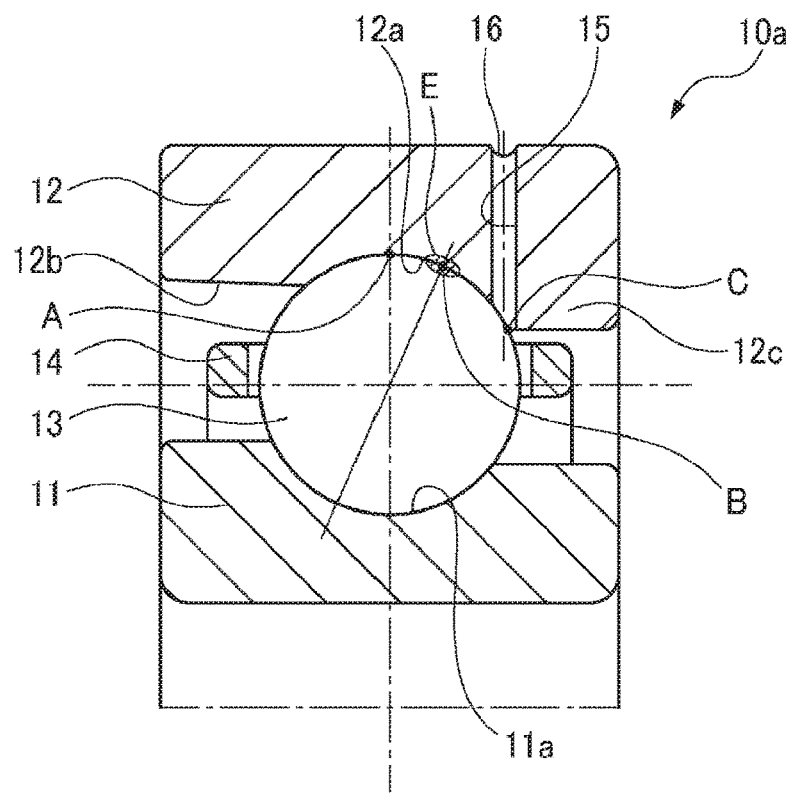
FIG. 8 is a sectional view depicting a ball bearing in accordance with a modified embodiment of the second embodiment of the present invention.

In the meantime, the axial position of the inner diameter-side opening of the radial hole 15 is not limited to the embodiment and may be spaced from the contact ellipse E between the ball 13 and the outer ring raceway groove 12a, and may be provided over the outer ring raceway groove 12a and the groove shoulder 12c at an opposite side to the groove bottom A of the outer ring 12 with respect to the contact point of the ball 13 and the outer ring 12, as shown in FIG. 8.

Figure 9:
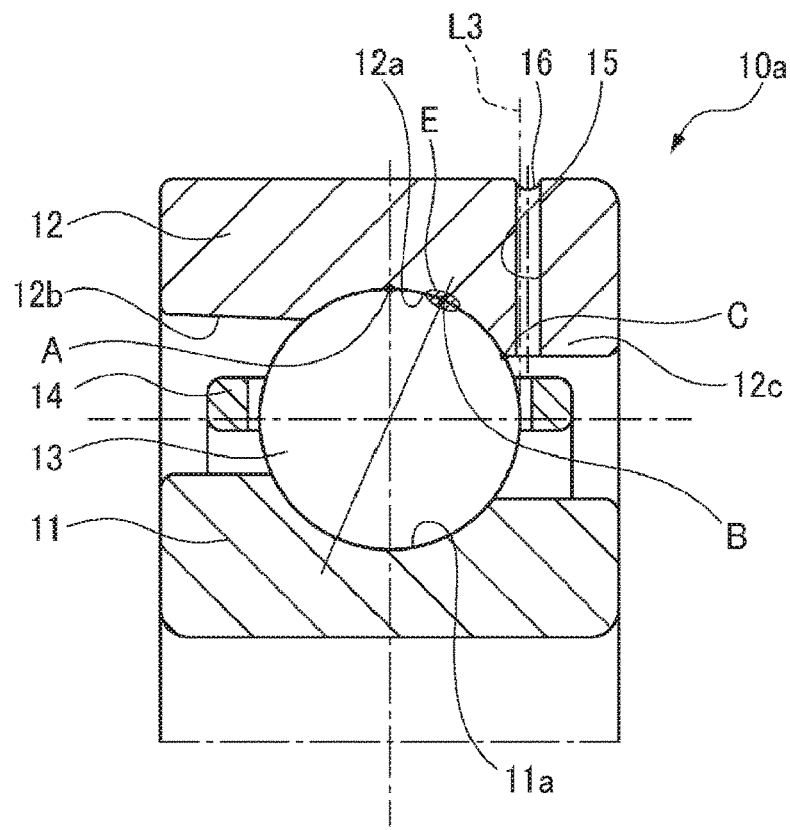
FIG. 9 is a sectional view depicting a ball bearing in accordance with another modified embodiment of the second embodiment of the present invention.
Figure 10A:
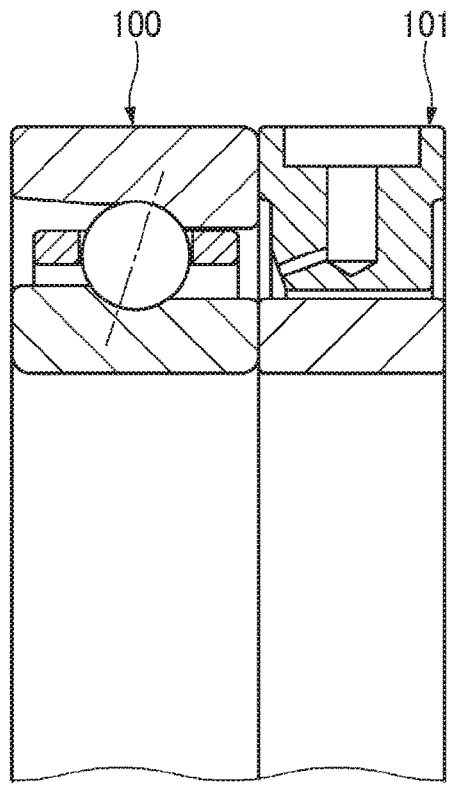
FIGS. 10A and 10B are sectional views depicting oil/air lubrication of the related art in which a nozzle piece is used.
Figure 10B:
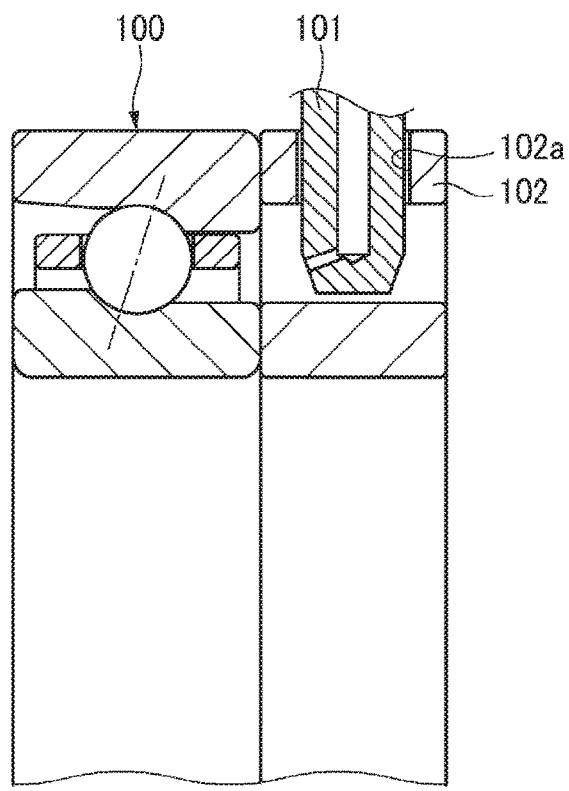
Figure 11:
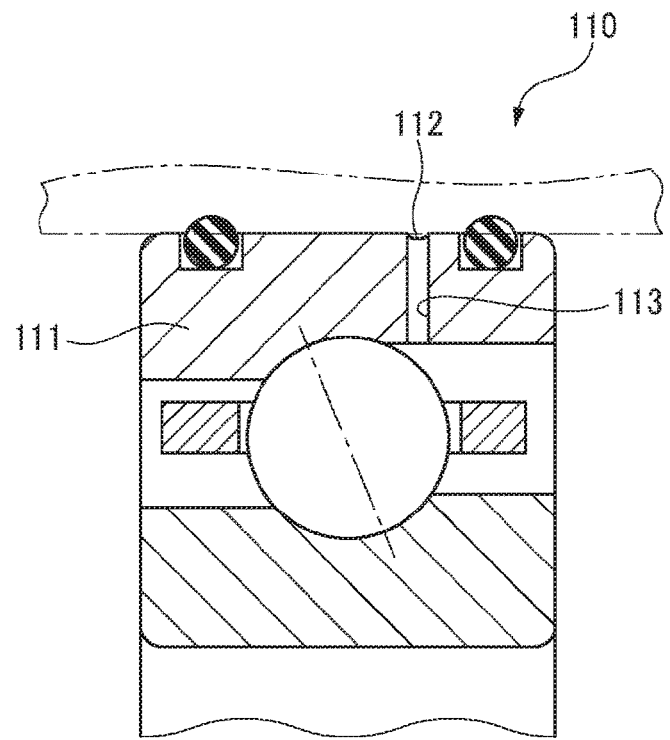
FIG. 11 is a sectional view of a ball bearing of oil/air lubrication of an outer ring oil supply specification.
Figure 12:
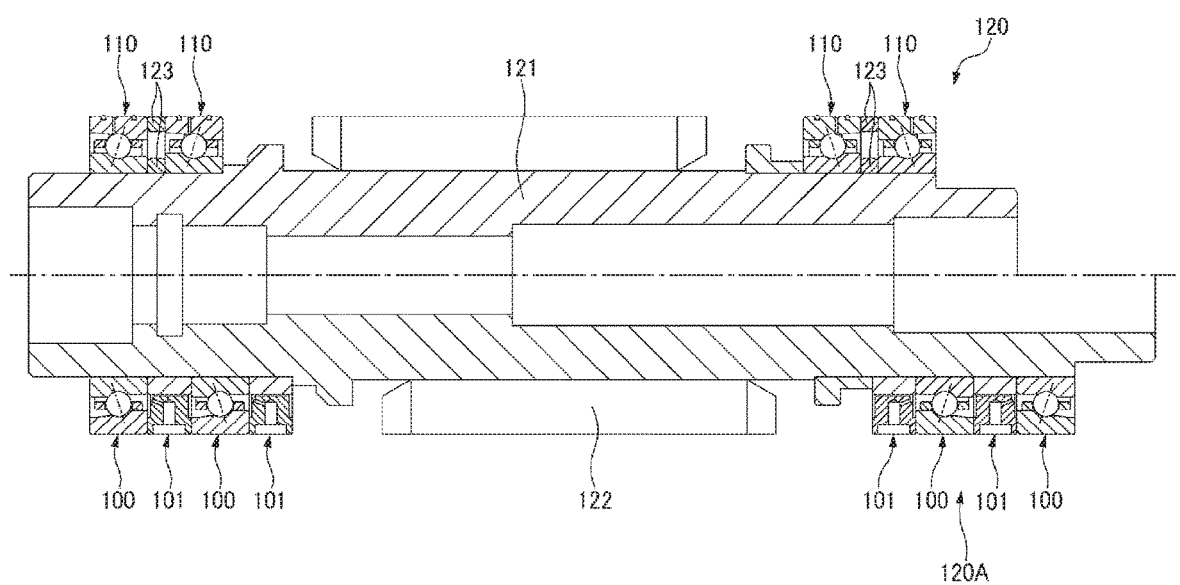
FIG. 12 is a sectional view depicting a spindle where oil/air lubrication of an outer ring oil supply specification is performed (upper half) and is a sectional view depicting a spindle where oil/air lubrication using a nozzle piece is performed (lower half).

Alternatively, as shown in FIG. 9, the axial position of the inner diameter-side opening of the radial hole 15 is provided in the groove shoulder 12c, and at least a part of the inner diameter-side opening of the radial hole 15 axially overlaps the ball 13. That is, the axial position may be provided in the groove shoulder 12c so that the entire inner diameter-side opening of the radial hole 15 is to axially overlap the ball 13 or may be provided in the groove shoulder 12c so that a part of the inner diameter-side opening of the radial hole 15 is to axially overlap the ball 13 (i.e., in FIG. 9, to intersect with a tangential line L3 at an axial end portion of the ball 13).

Also in any modified embodiment, like the embodiment, it is possible to improve the lubricity during the rotation of the bearing and to suppress the increase in contact surface pressure.

In the meantime, as the lubrication method of the rolling bearing that is adopted for the machine tool spindle, grease lubrication, oil/air lubrication, oil/mist lubrication and the like may be exemplified.

In recent years, the high-speed machine tool spindle has been developed. When the grease lubrication is adopted in a region of dmN 800,000 or higher, the problems such as an early damage of the bearing are caused. For this reason, when the second embodiment is adopted, it is possible to suppress the problems even though the bearing is used in the region of dmN 800,000 or higher.

Also, in a combination of the oil/air lubrication of the related art and a bearing of a steel ball specification, the early seizure is likely to be caused in a region of dmN 1,100,000 or higher. As one of causes of the early seizure, the lowering in lubricity due to the high heat generation at the contact parts of the ball 13 and the inner and outer rings 11, 12 may be exemplified. When the outer ring oil supply type having higher reliability than the oil/air lubrication of the related art (i.e., the outer ring oil supply type capable of securely supplying the lubricating oil to the ball) is adopted, it is possible to suppress the early seizure. That is, the second embodiment can achieve better effects in the region of dmN 1,100,000 or higher.

Also, in a higher-speed region, a bearing of a ceramic ball specification and the oil/air lubrication of the related art are adopted. However, in a region of dmN 1,500,000 or higher, the supply of oil particles from a nozzle for oil supply is disturbed due to the air curtain generated in association with the high-speed rotation of the bearing, so that the lubricating oil is not securely supplied into the bearing and the seizure may be thus caused. In the case of the outer ring oil supply type, since it is possible to directly supply the oil particles to the ball 13, it is possible to suppress the lubrication defect due to the air curtain and the bearing damage due to the poor lubrication. That is, in the region of dmN 1,500,000 or higher, when the ceramic ball and the second embodiment are together adopted, it is possible to obtain the stable high-speed rotation performance by the high-speed performance of the bearing specification and the lubricating oil supply action of the second embodiment.

In the meantime, the present invention is not limited to the above embodiments, and can be appropriately modified and changed.

For example, the radial hole may be any radial hole penetrating the outer ring from the outer peripheral surface to the inner peripheral surface in the radial direction, and may be inclined in the axial direction or the circumferential direction, in addition to the first embodiment where it is formed in the radial direction (parallel with a plane taken along the radial direction).

Also, in the above embodiments, the outer ring 12 has one radial hole. However, the present invention is not limited thereto. For example, the outer ring may have a plurality of radial holes.

In the meantime, as the method of supply the lubricating oil into the radial hole of the outer ring, oil/mist lubrication may be adopted, in addition to the oil/air lubrication. Oil/jet lubrication may also be adopted, depending on situations. However, in a grease supply method of supplying grease from the radial hole 15 of the outer ring 12 by using a lubricant supply device provided around the bearing or outside the spindle, if the radial hole 15 is formed to open toward an inside of the outer ring raceway groove 12a, the intersection part of the inner peripheral surface of the groove shoulder 12c and the outer ring raceway groove 12a or the vicinity of the outer ring raceway groove in the inner peripheral surface of the groove shoulder 12c, the semisolid grease containing thickener is supplied into the outer ring raceway groove 12a.

In this case, since the grease is caught into the outer ring raceway groove 12a, the problems such as increase in torque and abnormal heat generation are generated due to stirring resistance. Particularly, the problems are more likely to be generated during the high-speed rotation, like the second embodiment. Therefore, the oil lubrication method of supplying the lubricating oil, which does not contain the thickener, is preferable in the present invention.

Also, the ball bearing of the present invention is not limited to the spindle device for machine tool and can be applied as a ball bearing of a general industrial machine and a high-speed rotating device such as a motor, too.

The subject application is based on Japanese Patent Application No. 2016-159260 filed on Aug. 15, 2016, the contents of which are incorporated herein by reference.

DESCRIPTION OF REFERENCE NUMERALS

10: angular ball bearing (ball bearing)
11: inner ring
11a: inner ring raceway groove
12: outer ring
12a: outer ring raceway groove
12b: counterbore
12c: groove shoulder
13: ball
14: cage
15: radial hole
16: concave groove
E: contact ellipse

The invention claimed is:

1. A ball bearing comprising:
an inner ring having an inner ring raceway groove formed in an outer peripheral surface;
an outer ring having an outer ring raceway groove formed in an inner peripheral surface, a counterbore formed at one axial side of the outer ring raceway groove, and a groove shoulder formed at the other axial side of the outer ring raceway groove; and
a plurality of balls arranged rollably between the inner ring raceway groove and the outer ring raceway groove,
wherein the ball bearing is lubricated by lubricating oil,
wherein the outer ring has at least one radial hole penetrating from an outer peripheral surface thereof to the inner peripheral surface thereof in a radial direction, and
wherein an axial position of an inner diameter-side opening of the radial hole is located between a groove bottom of the outer ring and a contact point of the ball and the outer ring and is spaced from a contact ellipse between the ball and the outer ring raceway groove.

2. The ball bearing according to claim 1,
wherein the outer peripheral surface of the outer ring is formed with a concave groove which is formed along a circumferential direction and which is configured to communicate with the radial hole.

3. The ball bearing according to claim 2,
wherein the outer peripheral surface of the outer ring is formed with annular grooves which is formed along the circumferential direction and which is formed at both axial sides with the concave groove being interposed therebetween, and
wherein an annular seal member is arranged in each of the annular grooves.

4. The ball bearing according to claim 1,
wherein a diameter of the radial hole is 0.5 to 1.5 mm.

5. The ball bearing according to claim 1,
wherein a contact angle of the ball is within a range of 25 to 60°.

6. A spindle device comprising:
the ball bearing according to claim 1;
a cylindrical roller bearing arranged at a side of the ball bearing; and
a housing to which the outer ring of the ball bearing and an outer ring of the cylindrical roller bearing are internally fitted,
wherein a radial gap ($\Delta$) between the outer peripheral surface of the outer ring of the ball bearing and an inner peripheral surface of the housing to which the outer ring of the ball bearing is internally fitted is 0.01 to 1 mm measured by a radius measuring method.

7. A machine tool comprising the spindle device according to claim 6.

8. A ball bearing comprising:
an inner ring having an inner ring raceway groove formed in an outer peripheral surface;
an outer ring having an outer ring raceway groove formed in an inner peripheral surface, a counterbore formed at one axial side of the outer ring raceway groove, and a groove shoulder formed at the other axial side of the outer ring raceway groove; and
a plurality of balls arranged rollably between the inner ring raceway groove and the outer ring raceway groove, wherein the ball bearing is lubricated by lubricating oil,
wherein the outer ring has at least one radial hole penetrating from an outer peripheral surface thereof to the inner peripheral surface thereof in a radial direction, and
wherein an axial position of an inner diameter-side opening of the radial hole is located in the outer ring raceway groove at an opposite side to a groove bottom of the outer ring with respect to a contact point of the ball and the outer ring and is spaced from a contact ellipse between the ball and the outer ring raceway groove.

9. A spindle device comprising:
the ball bearing according to claim 8;
a cylindrical roller bearing arranged at a side of the ball bearing; and
a housing to which the outer ring of the ball bearing and an outer ring of the cylindrical roller bearing are internally fitted,
wherein a radial gap (Δ) between the outer peripheral surface of the outer ring of the ball bearing and an inner peripheral surface of the housing to which the outer ring of the ball bearing is internally fitted is 0.01 to 1 mm measured by a radius measuring method.

10. A ball bearing comprising:
an inner ring having an inner ring raceway groove formed in an outer peripheral surface;
an outer ring having an outer ring raceway groove formed in an inner peripheral surface, a counterbore formed at one axial side of the outer ring raceway groove, and a groove shoulder formed at the other axial side of the outer ring raceway groove; and
a plurality of balls arranged rollably between the inner ring raceway groove and the outer ring raceway groove,
wherein the ball bearing is lubricated by lubricating oil,
wherein the outer ring has at least one radial hole penetrating from an outer peripheral surface thereof to the inner peripheral surface thereof in a radial direction, and
wherein an axial position of an inner diameter-side opening of the radial hole is spaced from a contact ellipse between the ball and the outer ring raceway groove and is provided over the outer ring raceway groove and the groove shoulder at an opposite side to a groove bottom of the outer ring with respect to a contact point of the ball and the outer ring.

11. A spindle device comprising:
the ball bearing according to claim 10;
a cylindrical roller bearing arranged at a side of the ball bearing; and
a housing to which the outer ring of the ball bearing and an outer ring of the cylindrical roller bearing are internally fitted,
wherein a radial gap (Δ) between the outer peripheral surface of the outer ring of the ball bearing and an inner peripheral surface of the housing to which the outer ring of the ball bearing is internally fitted is 0.01 to 1 mm measured by a radius measuring method.

12. A ball bearing comprising:
an inner ring having an inner ring raceway groove formed in an outer peripheral surface;
an outer ring having an outer ring raceway groove formed in an inner peripheral surface, a counterbore formed at one axial side of the outer ring raceway groove, and a groove shoulder formed at the other axial side of the outer ring raceway groove; and
a plurality of balls arranged rollably between the inner ring raceway groove and the outer ring raceway groove,
wherein the ball bearing is lubricated by lubricating oil,
wherein the outer ring has at least one radial hole penetrating from an outer peripheral surface thereof to the inner peripheral surface thereof in a radial direction,
wherein an axial position of an inner diameter-side opening of the radial hole is provided in the groove shoulder, and
wherein at least a part of the inner diameter-side opening of the radial hole axially overlaps the ball.

13. A spindle device comprising:
the ball bearing according to claim 12;
a cylindrical roller bearing arranged at a side of the ball bearing; and
a housing to which the outer ring of the ball bearing and an outer ring of the cylindrical roller bearing are internally fitted,
wherein a radial gap (Δ) between the outer peripheral surface of the outer ring of the ball bearing and an inner peripheral surface of the housing to which the outer ring of the ball bearing is internally fitted is 0.01 to 1 mm measured by a radius measuring method.

* * * * *